United States Patent [19]

Coffman

[11] 4,203,572
[45] May 20, 1980

[54] LOCKING BALL VALVE

[75] Inventor: Ronald D. Coffman, McHenry, Ill.

[73] Assignee: Coffman Manufacturing Corp., Cary, Ill.

[21] Appl. No.: 950,588

[22] Filed: Oct. 12, 1978

[51] Int. Cl.² ............................................. F16K 35/00
[52] U.S. Cl. ..................................... 251/95; 251/104; 251/288
[58] Field of Search ................. 251/95, 98, 101, 102, 251/104, 105, 106, 286, 288, 107, 108, 90, 93

[56] References Cited

U.S. PATENT DOCUMENTS

| | | | |
|---|---|---|---|
| 705,419 | 7/1902 | Merrill | 251/104 |
| 951,878 | 3/1910 | Dolan | 251/105 |
| 1,139,208 | 5/1915 | McMurray | 251/105 |
| 1,233,406 | 7/1917 | Scholl et al. | 251/104 |
| 1,578,109 | 3/1926 | Trudell | 251/107 |
| 1,740,945 | 12/1929 | Kuehn et al. | 251/105 |
| 1,758,727 | 5/1930 | Wildin | 251/104 |
| 2,223,032 | 11/1940 | Farmer | 251/102 |
| 3,648,970 | 3/1972 | Hartmann et al. | 251/104 |

FOREIGN PATENT DOCUMENTS

| | | | |
|---|---|---|---|
| 135156 | 3/1933 | Austria | 251/105 |
| 450214 | 8/1948 | Canada | 251/106 |

*Primary Examiner*—Martin P. Schwadron
*Assistant Examiner*—G. L. Walton
*Attorney, Agent, or Firm*—McCaleb, Lucas & Brugman

[57] ABSTRACT

A locking type ball valve or a lock for a ball valve of the type having a handle movable through a right angle to open the valve in one position and close it in the other and a pair of stops on the housing of the valve to limit the movement of the handle to the right angle. A locking device is welded to the handle of the valve and has a shaft pivotable between two positions and a plate offset to one side of the shaft, the plate, in one position of the shaft, being opposed to one of said stops to lock the handle in either one of the open or closed positions and being removed from opposition with the stops in the other position of the shaft.

9 Claims, 7 Drawing Figures

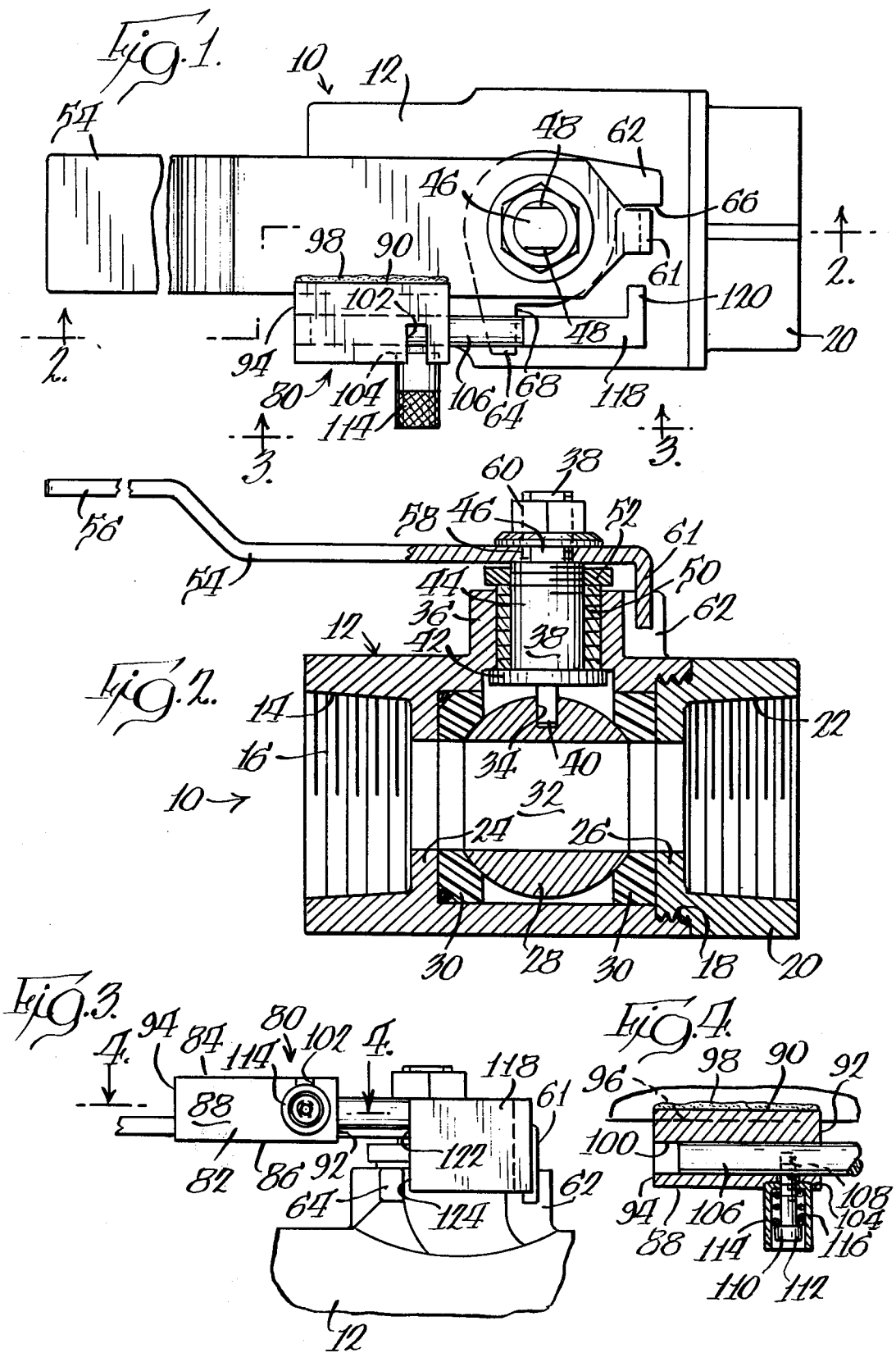

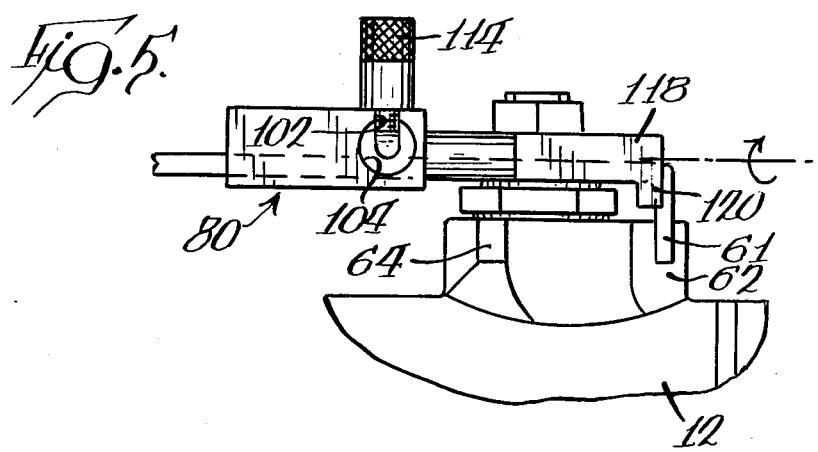
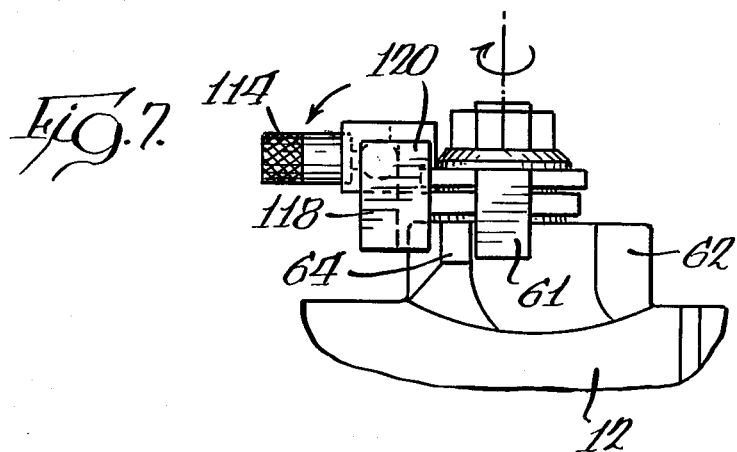
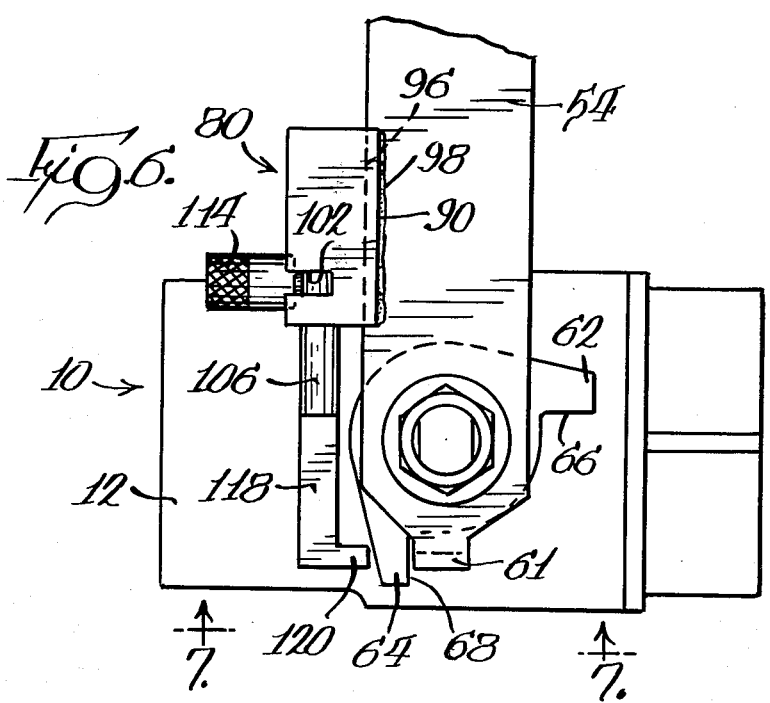

LOCKING BALL VALVE

BACKGROUND OF THE INVENTION

This invention pertains to ball valves or other valves characterized by the movement of a handle through 90° to open or close the valve. Interacting stop means on the handle and on the valve body limit the swing of the valve handle to the 90° arc to position the valve ball or its equivalent in either a full open or full closed position. A recurrent problem in such valves is the provision of means to insure that the valve will not be accidentally displaced from either its full open or full closed position. The problem is particularly acute in the conventional ball valve when it is positioned in the full closed position at which time the handle extends transversely out from the valve and the line it is situated in. Such an outstanding handle provides a ready target for passing traffic.

SUMMARY OF THE INVENTION

This invention contemplates a valve lock which is exceedingly simple in construction and easily attached to an existing valve assembly; which is positive in its action and is characterized by a high level of strength as against accidentally applied forces. The lock includes a positive latching arrangement to prevent its accidental displacement from its locking position or its unlocked position.

The lock consists of a shaft rotatable through 90° extending generally parallel to the axis of the handle and above the plane of the stops on the housing and having at its free end a plate offset thereon providing transverse edges which are carried in one position above the stops of the housing to permit movement of the valve handle and in another position in confrontation with the stops to trap the handle with respect to the stops. The lock has positive means to prevent its escape from the handle locking position.

The lock consists of only five pieces, and of these five, only two require relatively simple special fabrication. The other three are stock hardware items. Other objects and advantages will be apparent from the following description and drawings.

BRIEF DESCRIPTION OF THE DRAWINGS

FIG. 1 is a top plan view of a ball valve incorporating an embodiment of the lock of the present invention, the lock being shown in locking position with the valve open;

FIG. 2 is a section taken substantially along the line 2—2 of FIG. 1 looking in the direction of the arrows;

FIG. 3 is a side elevation of the top central portion of FIG. 1 taken substantially from the line 3—3 of FIG. 1 looking in the direction of the arrows;

FIG. 4 is a section taken along the line 4—4 of FIG. 3 looking in the direction of the arrows;

FIG. 5 is a view similar to FIG. 3 showing the lock in its unlocked position;

FIG. 6 is a top plan view similar to FIG. 1 showing the valve locked in its closed position; and FIG. 7 is a fragmentary side elevation of FIG. 6 taken from the line 7—7 of FIG. 6.

DESCRIPTION OF A PREFERRED EMBODIMENT

In the figures is shown a common, commercial ball valve 10 consisting of a cast metal valve body 12 formed to have a passage 14 therethrough for fluid flow, internally threaded at one end 16 for connection to a fluid line and at the other end 18 for a tubular cap 20. The cap 20 is internally threaded at its outer end 22 also for connection to a fluid line. The valve body 12 and cap 20 have internal annular retainer walls 24 and 26 which contain between them the ball 28 and teflon or synthetic rubber valve seats 30. The ball has a diametrical opening 32 therethrough and a key slot 34 in the wall thereof.

The valve body has a tubular boss 36 on one side thereof which contains the valve stem 38. The stem includes a key 40 at its lower end fitting into the key slot 34 of the ball, a flange 42 upward therefrom engaging against an internal shoulder of the boss 36, a shank portion 44 of less diameter, and a threaded end portion 46 having flats 48 on opposite sides thereof. Packing rings 50 are contained between the shank 44 and the inside of the boss 36, and a packing gland 52 threaded onto the shank 44 compresses the packing rings for a fluid-tight seal.

A flat strap handle 54 is employed to operate the valve. The handle may have an offset 56 therein for convenience in manipulation. At its operative end, it has a flat sided hole 58 formed therein adapted to fit over the threaded end of the valve stem so as to lock non-rotatably thereto. A nut 60 secures the handle against the upper end of the shank portion 44. Forward of the hole 58, the handle has a central, narrow, down-turned tongue 61 extending into overlapping relation with and narrowly spaced from the boss 36.

A pair of stops 62 and 64 are integrally formed on the boss to approximately the full height thereof and offer surfaces 66 and 68 extending approximately radially out from the boss a sufficient distance to intercept the tongue 61. The angle of separation between the surfaces is approximately 90°. The stop 62 and 64 are oriented to limit the movement of the handle between a position longitudinal with respect to the valve body when the ball 28 is aligned for full fluid flow and transverse with respect to the body when the ball is in its closed position. The term "approximate" is used because the angularity between the faces 66 and 68 is enlarged and their radially modified to compensate for the width of the tongue 61.

The structure as thus far described is entirely conventional and commercially available.

The lock 80 forming the subject of this invention consists first of a rectilinear block 82 having a long axis. The block has an upper surface 84, a lower surface 86, an outer surface 88, an inner surface 90, a front end 92 and a rear end 94. The block has a longitudinal slot 96 milled therein toward the bottom of the inner surface 90 proportioned to receive closely the thickness of the handle 54. The edge of the handle is inserted in the slot and the block welded to the handle along the slot edges as at 98 to attach the block to the handle. The block is attached rearwardly of the pivoting axis 46 of the handle a short distance.

A longitudinal hole 100 is drilled through the block. A transverse slot 102 is milled through the upper outer corner of the block to intercept the hole 100. A shallow, relatively large diameter pocket 104 is drilled in the outer surface of the block concentric with the lower end of the transverse slot 102.

A cylindrical shaft 106 is contained in the hole 100 and extends out beyond the front of the block. The shaft has a threaded hole 108 formed therein in register with the transverse slot 102. A cap screw 110 is threaded into the hole 108 to extend out through the transverse slot with the head 112 thereof standing well away from the block. A cup shaped, knurled knob 114 having a hole in the bottom thereof proportioned to fit closely the shank of the cap screw 110 is secured by the cap screw to the shaft 106 with the head of the cap screw inside the knob 114, and a compression spring 116 contained between the bottom of the knob and the head 112 of the cap screw 110 urges the knob toward the block. The pocket 104 is proportioned to receive the bottom end of the knob 114.

The spring permits a sufficient outward movement of the knob 114 so that it can pass over the upper outer edge of the block but such outward extension is a stress condition. The positions of repose are with the knob upwardly vertical and flat against the top surface 84 of the block 82 for extending laterally outward and contained in the pocket 104. The first of these is the unlocked condition of the valve; the second, the locked condition. The knob may be moved from the unlocked to the locked position by simple lateral pressure, but to be moved reversely, the knob must be axially pulled out of the pocket before lateral movement is possible. The knob thus serves as a detent to hold the lock positively in the locked position.

The lock is completed by a locking plate 118 which is welded to the free or inner end of the shaft 106.

The plate is a simple rectilinear body having a thickness about equal to the diameter of the shaft 106 and a somewhat greater length in the direction of the axis of the shaft 106 than width, and includes a lip 120 extending inward or downward through a right angle on the forward end thereof. The plate is attached at its rear edge 122 to the end of the shaft 106 immediately adjacent its inner or upper edge so that it is offset with respect to the shaft and extends well to one side thereof. The width of the plate 106 and its relation with the knob 114 is that, when the knob is seated in the pocket 104, that portion of the plate to the side of the axis of the shaft 106 is brought down into confronting relationship with the stops 62 or 64. When the knob is turned to its uppermost position, the plate is rotated into a horizontal position above the level of the stops 62 and 64 so that there is no interference with the free movement of the valve handle 54. Attention is directed to FIG. 5 wherein the position of the plate 118 elevated above the stops 62 and 64 is particularly illustrated.

FIGS. 1 and 3 illustrate the locking position of the plate when the valve is fully opened. In that situation, the handle 54 is axially aligned with the valve body 12 and the tongue 61 engaged against the face 66 of the stop 62. When the handle is in this position and the plate 118 of the lock is rotated down, the heel 124 of the plate 118 or that portion of the rear edge of the plate remote from the shaft 106 engages closely the face 68 of the stop 64. With the tongue and the heel of the plate being engaged in the internal angle between the surfaces 66 and 68 of the stops, the handle is immobilized.

The locking of the valve in the closed position is particularly illustrated in FIGS. 6 and 7. When the valve is closed, the handle 54 extends transversely with respect to the valve housing and the tongue 61 engages the stop 64 to limit the movement of the handle and to determine the precise handle position for valve closure. In this situation, with the lock plate again rotated down, the lip 120 on the plate 118 closely confronts the back side of stop 64. Stop 64 thus being closely embraced between the lip 120 and the tongue 61, the handle is again immobilized.

It will be appreciated that an embodiment only of the invention has been described here and that various alternatives in the practise thereof will suggest themselves to those skilled in the art, and that this invention, therefore, should be regarded as being limited only as set forth in the following claims.

I claim:

1. In a valve including a housing having a fluid flow passage therethrough, a closure member in said passage movable through a right angle to open or close said passage, a handle connected to move said closure member, stops on said housing situated about 90° apart with respect to the center of rotation of said stops and thereby limit the movement of said handle between said open and closed positions of said closure member; a valve lock comprising a shaft rotatably mounted to said handle for movement about said shaft's axis independent of said handle movement, said shaft having a plate rigidly attached thereto extending to one side of the axis thereof, said shaft being rotatable relative to said handle to a first position where said plate confronts closely a surface of one of said stops when said valve is in either the full open or the closed position wherein the tongue of the handle encounters the stop, at that position, to thereby prevent the displacement of said handle from said open or closed position, and to another position wherein said plate is removed from confrontation with said stop surfaces.

2. The combination as set forth in claim 1 including a block secured to said handle having a longitudinal bore therein receiving said shaft and means confining said shaft in said bore for said rotational movement only.

3. The combination as set forth in claim 2 wherein said confining means comprises a transverse slot in said block extending to said bore and across an edge of said block, and a spring loaded detent secured to said shaft through said slot and bearing resiliently on the exterior of said block.

4. The combination as set forth in claim 3 including a detent pocket at that end of said slot which said detent occupies when said plate is in stop-confronting position.

5. In a valve including a housing having a fluid flow passage therethrough, a closure member in said passage movable through a right angle to open or close said passage, a handle connected to move said closure member, stops on said housing having stop surfaces situated approximately 90° apart with respect to the center of rotation of said closure member, and a tongue on said handle to encounter said stop surfaces and thereby limit the movement of said handle between said open and closed positions of said closure member; a valve lock comprising a plate mounted to said handle adjacent the pivoting axis thereof, said plate characterized as mounted for rotation relative to said handle on an axis normal to said handle pivoting axis for movement into confrontation with said stops and away therefrom, one end of said plate in said confronting position when said tongue abuts one stop confronting the back side of said stop to prevent handle movement, the other end of said plate confronting said surface of said stop when said tongue abuts the other stop to prevent handle movement and said plate rotation being independent of said handle movement.

6. The combination of claim 5 wherein plate includes a lip extending angularly from said one end to more closely embrace said stop with said tongue.

7. In a valve including a housing having a fluid flow passage therethrough, a closure member in said passage pivotable through a right angle to open or close said passage, a handle connected to move said closure member, stops on said housing having surfaces situated about 90° apart with respect to the center of rotation of said closure member, and a tongue on said handle to encounter said surfaces and thereby limit the movement of said handle between said open and closed positions of said closure member; a valve lock comprising a block secured to a longitudinal edge of said handle having a bore therein parallel to said handle, a shaft contained in said bore to be rotatable through a right angle, said shaft having a free end extending outwardly of said bore toward said pivoting axis, a plate on the free end of said shaft having a portion extending to one side of the axis of said shaft with the forward free edge of said plate transversely substantially aligned with said tongue and the rear heel of said plate being substantially 90° away from said tongue with respect to said pivoting axis so that said forward edge, with said tongue, may embrace one of said stops to prevent handle movement away therefrom and said heel of said plate may confront the face of said stop when said tongue confronts the other of said stops to prevent handle movement away from said other stop.

8. The combination of claim 7 wherein said plate includes a lip extending angularly from said free edge to embrace more closely said stop.

9. The combination of claim 7 wherein rotation of said shaft moves said plate between a position confronting said stops and a position avoiding said stops.

* * * * *